Sept. 15, 1964 J. F. CUCAROLA 3,148,781
AUTOMATIC BALE RICKER
Filed Dec. 27, 1961 2 Sheets-Sheet 1
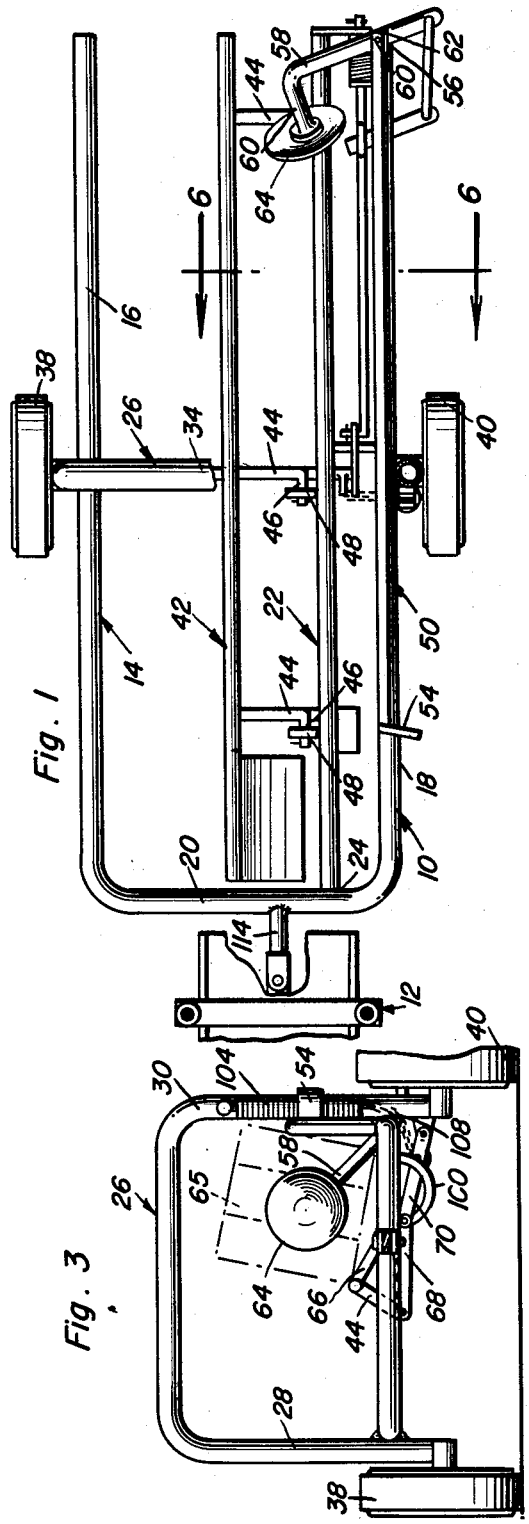
Joe F. Cucarola
INVENTOR.

Sept. 15, 1964  J. F. CUCAROLA  3,148,781
AUTOMATIC BALE RICKER
Filed Dec. 27, 1961  2 Sheets-Sheet 2
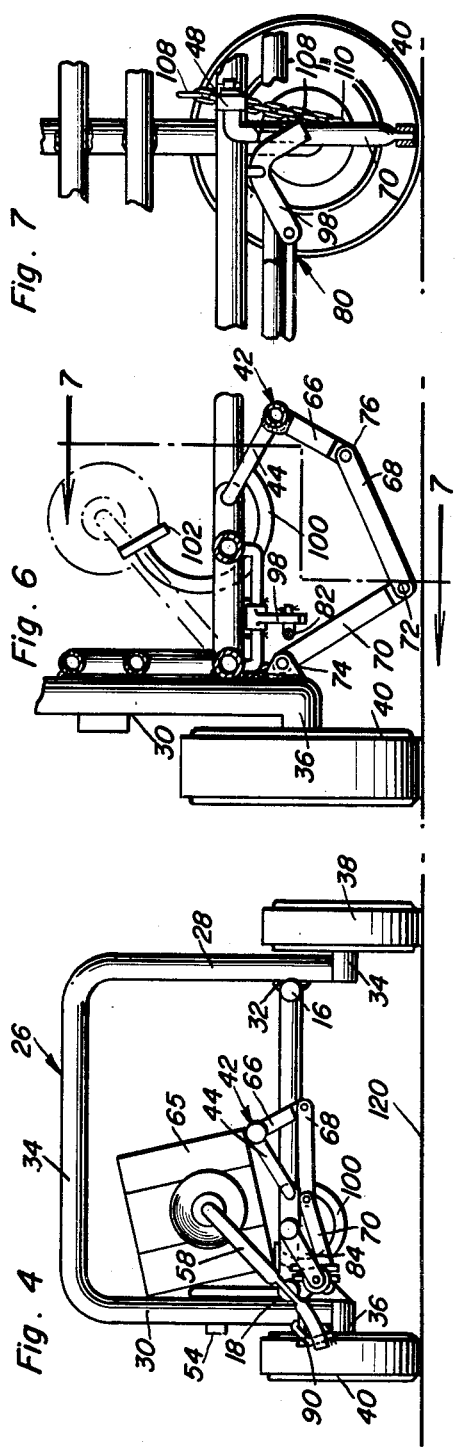
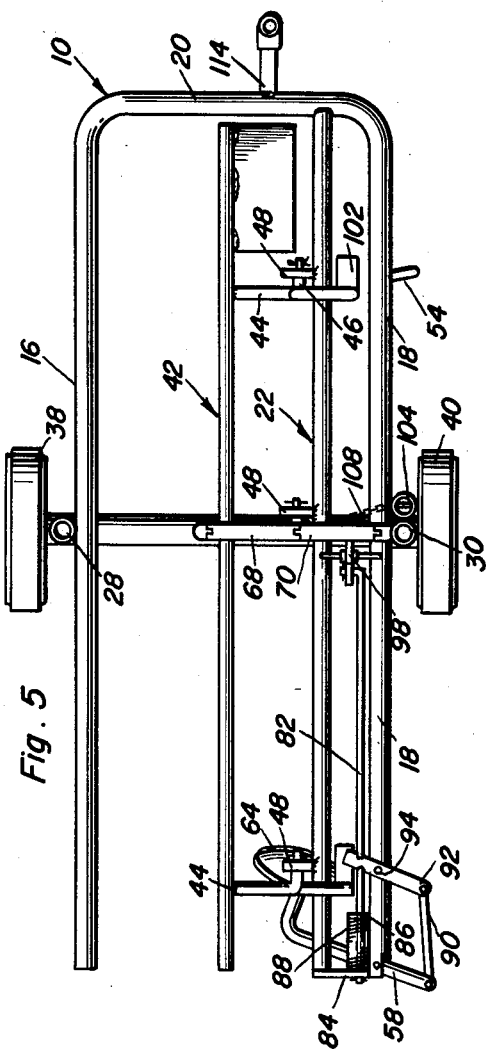
Joe F. Cucarola
INVENTOR.

United States Patent Office 3,148,781
Patented Sept. 15, 1964

3,148,781
AUTOMATIC BALE RICKER
Joe F. Cucarola, Rte. 2, Sterling, Colo.
Filed Dec. 27, 1961, Ser. No. 162,482
5 Claims. (Cl. 214—6)

This invention relates to a novel and useful automatic bale ricker and more specifically to a trailer-type of vehicle adapted to be pulled behind a hay baling machine and to receive sets of a plurality of hay bales from the hay baling machine and to intermittently discharge the sets of a plurality of hay bales onto the ground in a manner whereby the binding string or wire and the like which is utilized to bind the hay bales will not be disposed in contact with the ground.

Conventional types of hay baling machines intermittently eject single bales of hay and accordingly after a hay baler has been utilized to work one field, all of the bales of hay are disposed singly over the entire field. Gathering of these individual hay bales is time consuming and requires that the vehicle into which the hay bales are being loaded make numerous stops equalling one for each hay bale which is to be recovered.

While various types of pieces of arm machinery have been heretofore devised for collecting a plurality of hay bales being discharged from a hay baling machine and for intermittently ejecting a set of or a group of a plurality of bales of hay, these previous types of bale rickers have had many drawbacks such as high cost of production and the inability to discharge the bales of hay therefrom in a manner which will position the material which is utilized to bind the bales in an elevated position above the ground. Accordingly, it is the main object of this invention to provide an automatic bale ricker which may be towed behind a hay baling machine and utilized to automatically receive individual bales of hay from the hay baler and to thereafter intermittently discharge a plurality of collected hay bales in a manner whereby the material utilized to bind the hay bales will be disposed in an elevated position above the ground and about the sides of the hay bales as they are positioned on the ground.

A further object of this invention, in accordance with the immediately preceding object, is to provide a hay bale ricker which will be substantially automatic in operation and which may be readily manufactured to accommodate and to intermittently dispense different quantities of collected hay bales received from a hay baling machine.

A further object of this invention, in accordance with the preceding objects, is to provide an automatic hay bale ricker capable of receiving hay bales from a hay baling machine as they are discharged from the latter and in a manner maintaining the general orientation of the hay bales relative to the ground over which the hay bale machine is travelling with the hay bale ricker being provided with ejection means capable of ejecting a plurality of collected bales of hay therefrom in a manner whereby the hay bales are rotated one quarter turn about their longitudinal axis during their movement from the hay bale ricker to the ground over which the ricker is travelling.

A final object to be specifically enumerated herein is to provide an automatic hay bale ricker in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the hay bale ricker;
FIGURE 2 is a side elevational view of the hay bale ricker;
FIGURE 3 is a front end elevational view of the hay bale ricker;
FIGURE 4 is a rear end elevational view of the hay bale ricker;
FIGURE 5 is a bottom plan view of the hay bale ricker;
FIGURE 6 is an enlarged transverse vertical sectional view taken substantially upon the plane indicated by section line 6—6 of FIGURE 1; and
FIGURE 7 is an enlarged fragmentary longitudinal vertical sectional view taken substantially upon the plane indicated by section line 7—7 of FIGURE 6 and with parts of the hay bale ricker being broken away to more clearly illustrate the structural details thereof.

Referring now more specifically to the drawings the numeral 10 generally designates the automatic hay bale ricker of the instant invention which is shown in FIGURES 1 and 2 being pulled behind the rear end of a hay baling machine generally referred to by the reference numeral 12.

From FIGURE 1 of the drawings it may be seen that the hay bale ricker 10 comprises a main frame generally referred to by the reference numeral 14 which is substantially U-shaped in plan including a pair of opposite side members 16 and 18 which are interconnected at their forward ends by means of a bight portion 20. The main frame 14 also includes a first elongated and longitudinally extending slide support member generally referred to by the reference numeral 22 and it will be noted that the slide support member 22 is disposed inwardly of and adjacent the side member 18. The forward end of the slide support member 22 is secured to the bight portion 20 in any convenient manner such as by welding 24 and it is to be understood that other suitable bracing may be provided between the slide support member 22 and the side member 18 at points spaced longitudinally of the main frame 14 if desired.

A downwardly opening U-shaped brace member generally referred to by the reference numeral 26 is provided and includes a pair of depending legs 28 and 30 whose lower ends are secured to the side members 16 and 18 in any convenient manner such as by welding 32. The upper ends of the legs 28 and 30 are interconnected by means of a bight portion 34 and it will be noted that the terminal end portions of the legs 28 and 30 remote from the bight portion 34 project below the side members 16 and 18 and include outwardly projecting stub axles 34 and 36 respectively on which there are rotatably mounted ground engaging support wheels 38 and 40.

A second elongated longitudinally extending slide guide member is generally referred to by the reference numeral 42 and is mounted for swinging movement relative to the slide support member 22 by means of three crank arms 44 whose free ends include laterally directed end portions 46 which are rotatably received in journal blocks 48 carried by the slide support member 22.

From FIGURES 1 and 2 of the drawings it will be noted that the side member 18 includes an upstanding guide fence generally referred to by the reference numeral 50 which extends longitudinally therealong and which is provided with a deflecting baffle 54 at its forward end to insure that bales being ejected from the baling machine 12, when the baling machine is executing a turn, will not slide off the slide support members 22 and 42.

The rear end of the side member 18 is bifurcated as at 56 and the mid-portion of an actuating abutment lever 58 is pivotally secured between the furcations 60 thereof by means of a pivot pin 62. One end of the abutment lever 58 includes a forwardly directed end portion 60 with a convex abutment disk 64 mounted on its free end and it will be noted that the abutment disk 64 is disposed in longitudinal alignment with the slide support members 22 and 42 and is disposed a spaced distance thereabove for registry with the center of a bale 65 sliding rearwardly along the slide support members 22 and 42.

From FIGURE 4 of the drawings it will be noted that the bale 65 disposed on the forward end of the bale ricker 10 will have its inside lower corner supported by the slide support member 42 and its outside surface disposed in sliding contacting relation with the fence 50.

A crank arm 66 is carried by the slide support member 42 and is secured to the leg 30 by means of a pair of link members 68 and 70 which have their inner ends pivotally secured together as at 72. The free end of the link 70 is pivotally secured to the legs 30 as at 74 and the free end of the link 68 is pivotally secured to the crank arm 66 as at 76. From a comparison between FIGURES 4 and 6 of the drawings it will be noted that the slide support member 42 may be moved from a position disposed slightly lower than the slide support member 22 to a bale supporting position such as that illustrated in FIGURE 4 of the drawings with the slide support member 42 disposed in general horizontal alignment with the slide support member 22 or slightly thereabove. Additionally, it will be noted that the link members 68 and 70, when the slide support member 42 is disposed in its uppermost position, are disposed in an over-center position whereby the adjacent ends of the links 68 and 70 abut the undersurface of the center journal block 48 to prevent downward movement of the slide support member 42. However, with attention now directed to FIGURES 2, 5 and 7 of the drawings it may be seen that latch means generally referred to by the reference numeral 80 is provided for moving the link members 68 and 70 from their over-center poistion whereby the slide support member 42 will be free to swing downwardly relative to the slide support member 22.

The latch means 80 includes an elongated pull rod 82 which has one end slidingly disposed through a journal portion formed in a bracket 84 carried by the rear end of the main frame 14. A stop member 86 is carried by the pull rod 82 and a compression spring is disposed about the pull rod 82 between the stop member 86 and the bracket 84 and the compression spring 88 is utilized to resiliently urge the pull rod 82 to a forward-most position. It may best be seen from FIGURE 5 of the drawings that the end of the actuating lever 58 remote from the disk 64 is pivotally secured to one end of a connecting link 90 whose other end is pivotally secured to an operating lever 92 which is in turn pivotally secured to the side member 18 intermediate its opposite ends by means of a pivot pin 94. The end of the actuating lever 92 remote from the connecting lever 90 is engaged with a notched portion 96 of the pull rod 82 whereby oscillation of the actuating lever 58 will effect reciprocation of the pull rod 82. The forward end of the pull rod 82 is pivotally secured to one end of a bell crank 98 whose other end is disposed for engagement with the approximate mid-portion of the link member 70. Accordingly, when the link members 68 and 70 are disposed as illustrated in FIGURE 4 of the drawings, the pull rod 82 is moved rearwardly by rearward movement of the disk 64 effected by the contact of a bale 65 therewith, the bell crank 98 will engage the link member 70 to urge the link members 68 and 70 past the center position which will in turn enable the weight of the bales 65 disposed on the slide support member 42 to pivot the latter downwardly toward the position illustrated in FIGURE 6 of the drawings.

As can best be seen from FIGURES 5 and 6 of the drawings, each of the crank arms 44 includes an abutment ejector arm 100. Each of the abutment ejector arms 100 includes an enlarged free end portion 102 which is moved into engagement with the outer lower corner of the bale 65 transversely aligned therewith. Accordingly, upon movement of the slide support member 42 to the lower position, the enlarged end portions 102 will engage the corresponding bales 65 and have a tendency to rotate the latter in a clockwise direction as viewed from the rear of the bale record 10.

One end of an expansion spring 104 is secured to a mount 106 carried by the leg 30 and the other end of the expansion spring 104 is connected to a roller chain 108 which is in turn connected to a link member 70 as at 110. Thus, each time the bales 65 are discharged from the bail record 10, the expansion spring 104 will return the slide support member 42 to its uppermost position and the compression spring 88 will return the pull rod 82 to its forwardmost position. It will be observed that the bight portion 20 is provided with a tongue 114 for pivotally securing the forward end of the main frame 14 to the rear end of the bailing machine 12. In this manner, the baling machine 12 may be utilized to pull the hay bale ricker 10 and it may be seen that in operation the hay bale ricker 10 will receive three bales 65 before the rearmost bale 65 engages the disk 64. After the rearmost bale 65 engages the disk 64, the disk 64 will be moved rearwardly which will in turn effect a rearward pull on the pull rod 82 for breaking the link members 68 and 70 past their center position and enabling the slide support member 42 to swing downwardly by the weight of the bales 65 and the end portions 102 on the abutment arms 100 to rotate the bales 65 one-quarter turn during their movement from the hay bale ricker 10 to the ground 120.

It will be noted that the main frame 14 is free of obstructions between the slide support member 42 and the slide member 16 and that the operation of the bale ricker 10 is completely automatic.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic bale ricker comprising a longitudinally extending wheeled main frame, laterally spaced first and second elongated longitudinally extending slide support means supported from and extending along opposite side portions of said main frame and defining a generally horizontally disposed planar support disposed in an elevation to receive hay bales at its forward end for movement rearwardly therealong, said first slide support means being rigidly supported from said frame, means mounting said second slide support means for vertical movement relative to said main frame from an upper bale supporting position defining said horizontal planar support to a lower bale dumping position with said planar support inclined at least in the neighborhood of 45 degrees from the horizontal and for releasably retaining said second slide support means in said upper position, means normally urging said second slide support means toward said upper position, and latch means carried by said frame and engageable with said mounting means for releasing said scond guide support means from said upper position for free downward movement of the latter toward the lower position when having bales disposed thereon, said mounting means including articulated linkage means having an over-center position in which said linkage means is disposed when said second slide support means is in the upper position.

2. The combination of claim 1 wherein said latch means includes an abutment actuator mounted on the rear of said frame adapted to be engaged by the rearmost bale of hay being pushed along said first and second guide support means and is engageable with said linkage means for urging the latter past its center position to release said second guide support means in response to a hay bale engaging said abutment actuator.

3. The combination of claim 1 wherein said main frame is generally U-shaped in plan and includes a pair of side members interconnected by means of a bight portion, said first and second slide guide support means being disposed between said side members, said frame, between said second slide guide support means and the corresponding one of said side members being completely open and defining a vertically extending passage therebetween whereby bales dumped from said bale ricker may fall freely to the ground.

4. The combination of claim 3 wherein said main frame includes a downwardly opening U-shaped transverse brace member secured between said side members having a pair of depending legs to whose lower ends said side members are rigidly secured.

5. The combination of claim 1 wherein said other slide guide support means includes abutment ejector means mounted thereon and for movement laterally of said one slide guide support means from the side thereof remote from said other support means there toward upon movement of said other slide guide support means to said dumping position.

References Cited in the file of this patent

UNITED STATES PATENTS

| | | |
|---|---|---|
| 1,588,681 | Haney | June 15, 1926 |
| 1,629,181 | Sperry | May 17, 1927 |
| 2,316,435 | James | Apr. 13, 1943 |

FOREIGN PATENTS

| | | |
|---|---|---|
| 724,771 | Great Britain | Feb. 23, 1955 |
| 732,088 | Great Britain | June 15, 1955 |